US011441462B2

(12) United States Patent
De Smet et al.

(10) Patent No.: US 11,441,462 B2
(45) Date of Patent: Sep. 13, 2022

(54) METHODS AND SYSTEMS FOR AN AFTERTREATMENT ARRANGEMENT

(71) Applicant: Ford Global Technologies, LLC, Dearborn, MI (US)

(72) Inventors: Frederik De Smet, Genk (BE); Mario Balenovic, Waalre (NL)

(73) Assignee: Ford Global Technologies, LLC, Dearborn, MI (US)

( * ) Notice: Subject to any disclaimer, the term of this patent is extended or adjusted under 35 U.S.C. 154(b) by 740 days.

(21) Appl. No.: 16/279,662

(22) Filed: Feb. 19, 2019

(65) Prior Publication Data
US 2019/0271245 A1 Sep. 5, 2019

(30) Foreign Application Priority Data
Mar. 1, 2018 (DE) .......................... 102018203086.3

(51) Int. Cl.
*F01N 3/08* (2006.01)
*F01N 9/00* (2006.01)
*B60W 10/06* (2006.01)
*B60W 10/02* (2006.01)
*B60W 20/16* (2016.01)

(52) U.S. Cl.
CPC ........... *F01N 3/0885* (2013.01); *B60W 10/02* (2013.01); *B60W 10/06* (2013.01); *B60W 20/16* (2016.01); *F01N 9/00* (2013.01); *B60W 2710/021* (2013.01); *B60W 2710/0666* (2013.01); *F01N 2430/00* (2013.01); *F01N 2560/025* (2013.01); *F01N 2560/06* (2013.01)

(58) Field of Classification Search
CPC ...... B60W 10/02; B60W 10/06; B60W 20/16; B60W 2530/12; B60W 2710/021; B60W 2710/0666; B60Y 2300/472; F01N 2430/00; F01N 2560/025; F01N 2560/06; F01N 2900/08; F01N 2900/10; F01N 2900/104; F01N 2900/1404; F01N 2900/1602; F01N 2900/1614; F01N 2900/1631; F01N 3/0842; F01N 3/0871; F01N 3/0885; F01N 9/00
See application file for complete search history.

(56) References Cited

U.S. PATENT DOCUMENTS

| 9,453,442 B2 | 9/2016 | Keppy |
| 9,482,128 B2 | 11/2016 | Eckhoff et al. |
| 2009/0025371 A1 | 1/2009 | Hermansson et al. |

(Continued)

FOREIGN PATENT DOCUMENTS

| DE | 102013205541 A1 | 5/2014 |
| DE | 102015224652 A1 | 6/2016 |

*Primary Examiner* — Phutthiwat Wongwian
*Assistant Examiner* — Diem T Tran
(74) *Attorney, Agent, or Firm* — Vincent Mastrogiacomo; McCoy Russell LLP

(57) ABSTRACT

Methods and systems are provided for partially regenerating a lean $No_x$ trap in response to an engine shutdown request. In one example, an engine shutdown is delayed so that a low-temperature storing region of the lean $No_x$ trap is regenerated without regenerating a high-temperature storing region of the lean $No_x$ trap.

20 Claims, 6 Drawing Sheets

(56) References Cited

U.S. PATENT DOCUMENTS

2013/0204476 A1* 8/2013 Zink .................... B60W 10/06
                                                  701/22
2014/0026851 A1   1/2014 Harmsen et al.
2014/0090362 A1* 4/2014 Eckhoff ................... F01N 3/10
                                                  60/274

* cited by examiner

METHODS AND SYSTEMS FOR AN AFTERTREATMENT ARRANGEMENT

CROSS REFERENCE TO RELATED APPLICATION

The present application claims priority to German Patent Application No. 102018203086.3, filed Mar. 1, 2018. The entire contents of the above-listed application are hereby incorporated by reference for all purposes.

FIELD

The present description relates generally to an arrangement for regenerating a lean $NO_x$ trap (LNT) in response to an engine shut-down.

BACKGROUND/SUMMARY

The exhaust gas of internal combustion engines contains pollutants, (e.g. hydrocarbons), carbon monoxide and nitrogen oxides (NOx), the emissions limits of which may be regulated. In order to reduce the pollutant emissions due to exhaust gases, exhaust gas aftertreatment devices, e.g. catalytic converters, are employed, wherein said pollutants can be converted into compounds such as carbon dioxide, water and nitrogen, by oxidation or reduction.

However, nitrogen oxides may be reduced to nitrogen via an electronically controlled 3-way catalytic converters if the internal combustion engine is supplied with a constant stoichiometric ratio of air to fuel ($\lambda=1$). Even when there are small deviations into the lean range ($\lambda>1$) indicating an excess of oxygen, the nitrogen oxides reduction rate may be reduced. The reason is the small quantities of products of incomplete combustion, such as carbon monoxide and hydrocarbons, are oxidized to carbon dioxide by the excess oxygen. Accordingly, a catalytic converter of this kind is usually employed only on vehicles that have a spark-ignition engine and lambda closed-loop control which provides feedback of the composition of the air-fuel mixture. In the case of diesel and lean-mixture spark-ignition engines, on the other hand, other methods of treating nitrogen oxides are desired.

Catalytic converters for selective catalytic reduction (SCR catalytic converters) or NOx storage catalytic converters, also referred to as lean NOx traps (LNT catalytic converters), can be employed as exhaust gas aftertreatment devices for the reduction of nitrogen oxide emissions, for example.

The operation of an LNT catalytic converter is based on temporary storage of the nitrogen oxides during a lean-mixture operating mode of the internal combustion engine. To maintain the storage capacity for nitrogen oxides, regeneration of the LNT catalytic converter is demanded from time to time. For regeneration, the internal combustion engine can be operated with a rich air-fuel mixture for a period of a few seconds, for example, with the result that the LNT catalytic converter is supplied with a substoichiometric exhaust gas mixture. The reducing components contained in this substoichiometric exhaust gas mixture react with stored nitrogen oxides, thus ideally converting the nitrogen oxides to inert nitrogen gas.

The operation of SCR catalytic converters is based on continuous reduction of nitrogen oxides via ammonia, which can be obtained from an aqueous urea solution for example, which is fed into the exhaust gas flow upstream of the SCR catalytic converter. One special form of an SCR catalytic converter is an SDPF catalytic converter, which, as a diesel particle filter (DPF), is provided with a coating for selective catalytic reduction (SCR coating).

Common to most exhaust gas aftertreatment devices, especially catalytic converters, is the fact that they should be operated within a particular temperature range in order to operate in an optimum manner. If a minimum temperature, also referred to as the "light-off" temperature, is undershot, the catalytic conversion of the pollutants may be low and, as a result, emissions limits may be exceeded. If, on the other hand, the maximum temperature is exceeded, this too can be associated with reduced catalytic conversion. Moreover, unwanted secondary reactions can take place, and degradation (e.g., cracking) to the exhaust gas aftertreatment device may occur.

According to the previous examples, an LNT catalytic converter is often employed in combination with an SCR catalytic converter. In this case, the LNT catalytic converter serves primarily to store nitrogen oxides at low temperatures, (e.g. during a cold start of the internal combustion engine) where conversion rates of the SCR catalytic converter may be lower. If a minimum temperature is exceeded, the SCR catalytic converter is capable of converting nitrogen oxides. When a certain temperature is reached, the SCR catalytic converter is capable of ensuring adequate conversion of the nitrogen oxides by itself. Storage of nitrogen oxides in the LNT catalytic converter is then no longer desired or is only desired in small quantities, and it is therefore also possible to reduce the frequency of regeneration of the LNT catalytic converter, thus making it possible to save fuel demanded for regeneration and to reduce the emissions of carbon dioxide.

One difficulty arises if a motor vehicle is shut down with an LNT catalytic converter that is almost fully laden with nitrogen oxides before regeneration of the LNT catalytic converter has taken place. There is then inadequate storage capacity for nitrogen oxides available for a subsequent cold start of the internal combustion engine. This problem is further intensified in the actual use of the motor vehicle by the large number of possible driving cycles.

In order to avoid an inadequate storage capacity for nitrogen oxides when starting an internal combustion engine, there is a proposal in DE 10 2013 205 541 A1 to regenerate an LNT catalytic converter immediately before shutting down the internal combustion engine of a vehicle. Thus, during a subsequent restart of the internal combustion engine, the full storage capacity of the LNT catalytic converter is available for the nitrogen oxides.

However, there are difficulties in setting the correct regeneration conditions during the brief shutdown process of the internal combustion engine and in making available a sufficient quantity of reducing agent in this time window since the fuel supply is completely interrupted when the internal combustion engine is shut down. Moreover, the effective regeneration of the LNT catalytic converter also demands the maintenance of a minimum temperature.

Further developments in accordance with DE 10 2015 224 652 A1 and DE 10 2013 205 541 A1 are therefore based on delaying the shutdown of the internal combustion engine and regenerating the LNT catalytic converter during the delay by supplying a rich exhaust gas mixture to the LNT catalytic converter.

The disadvantage with these solutions is that regeneration consumes additional energy in order to drive the internal combustion engine and for the regeneration. That is to say, delaying the shutdown to regenerate the LNT catalytic converter consumes fuel, which is economically wasteful.

The inventors have identified these problems and come up with a way to at least partially solve them. It is the underlying object of the disclosure to specify possible ways of eliminating or at least mitigating the abovementioned disadvantages. The intention is to enable an at least partially empty LNT catalytic converter to be provided at the end of a random driving cycle. It would be desirable to keep down the fuel consumption used for this purpose.

In one example, the issues described above may be addressed by a system comprising an engine comprising an exhaust system comprising a lean-$NO_x$-trap (LNT), and a controller with computer-readable instructions stored on non-transitory memory thereof that when executed enable the controller to regenerate only a low-temperature storing region of the LNT without regenerating a high-temperature storing region of the LNT in response to an engine shutdown request. In this way, fuel consumption during the partial regeneration of the LNT may be reduced by not regenerating the high-temperature storing region.

As one example, the present disclosure is based on the underlying consideration that an LNT catalytic converter can have low-temperature storage locations and high-temperature storage locations, wherein the low-temperature storage locations are primarily used to store nitrogen oxides after a cold start of the internal combustion engine. Accordingly, the intention is to ensure that there is sufficient storage capacity in the low-temperature storage locations when the internal combustion engine is cold-started. In order to achieve this, the low-temperature storage locations of the LNT catalytic converter are regenerated if there is a shutdown demand for shutting down the internal combustion engine, that is to say, for example, at the end of a driving cycle of a motor vehicle before the final parking of the motor vehicle. The regeneration of the low-temperature storage locations can be performed by thermal desorption and/or rich-mixture operation of the internal combustion engine. Accordingly, regeneration of the low-temperature storage locations should be taken to mean performing measures, such as thermal desorption (thermal regeneration), wherein emptying of the nitrogen oxide reservoirs can be achieved, ensuring that a higher nitrogen oxide storage capacity is available in the low-temperature storage locations after regeneration has been completed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
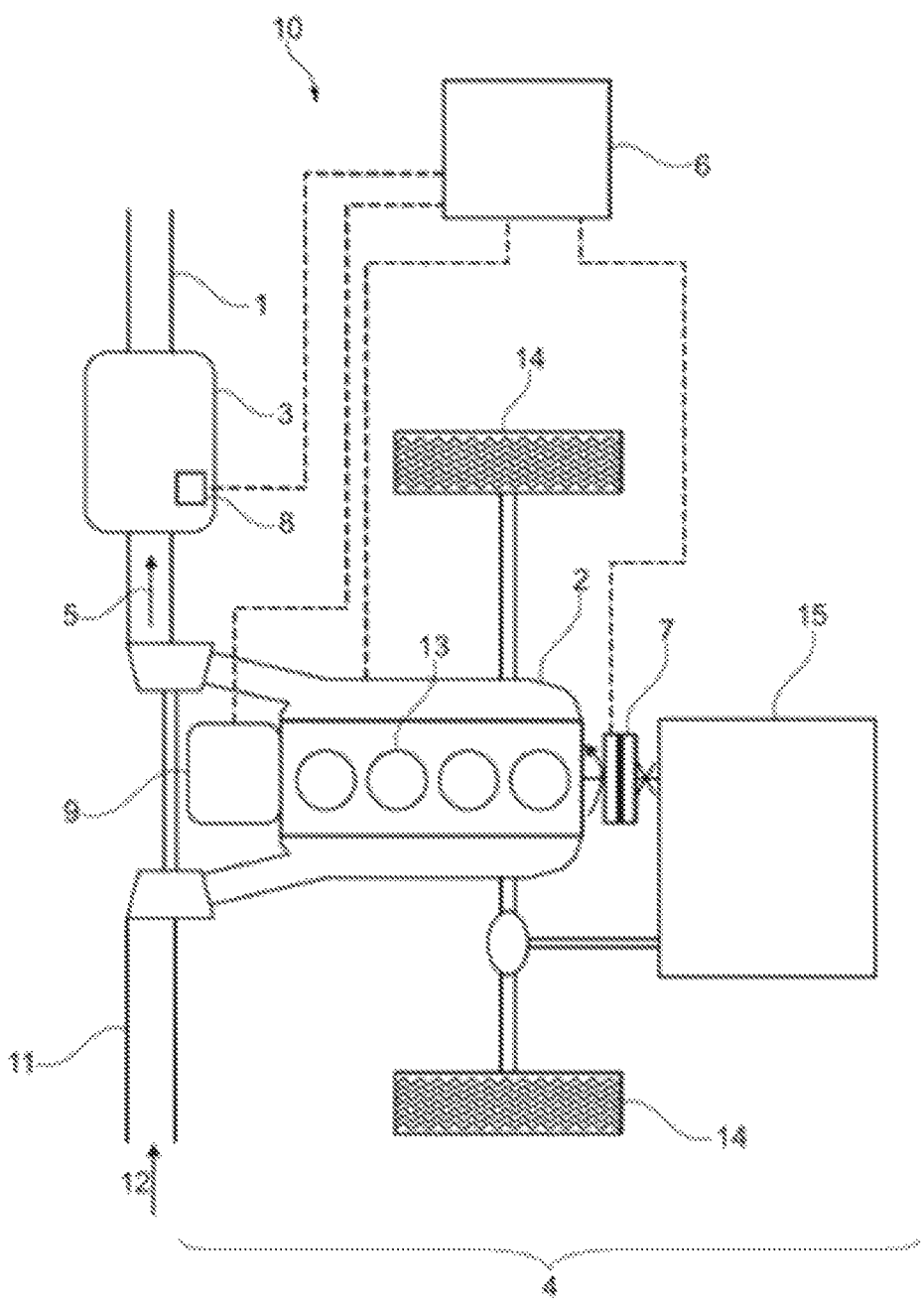
FIG. 1 illustrates shows a schematic illustration of one embodiment of a motor vehicle according to the disclosure
Figure 2:
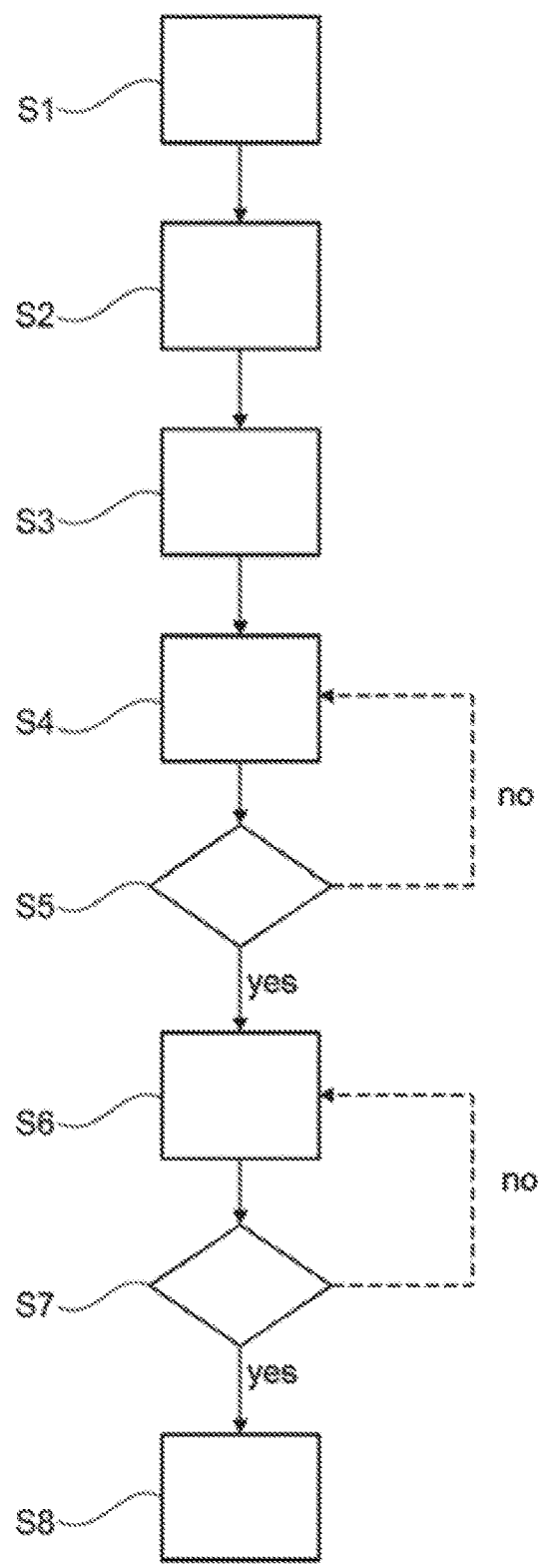
FIG. 2 shows a flow diagram of one embodiment of a method according to the disclosure.
Figure 3:
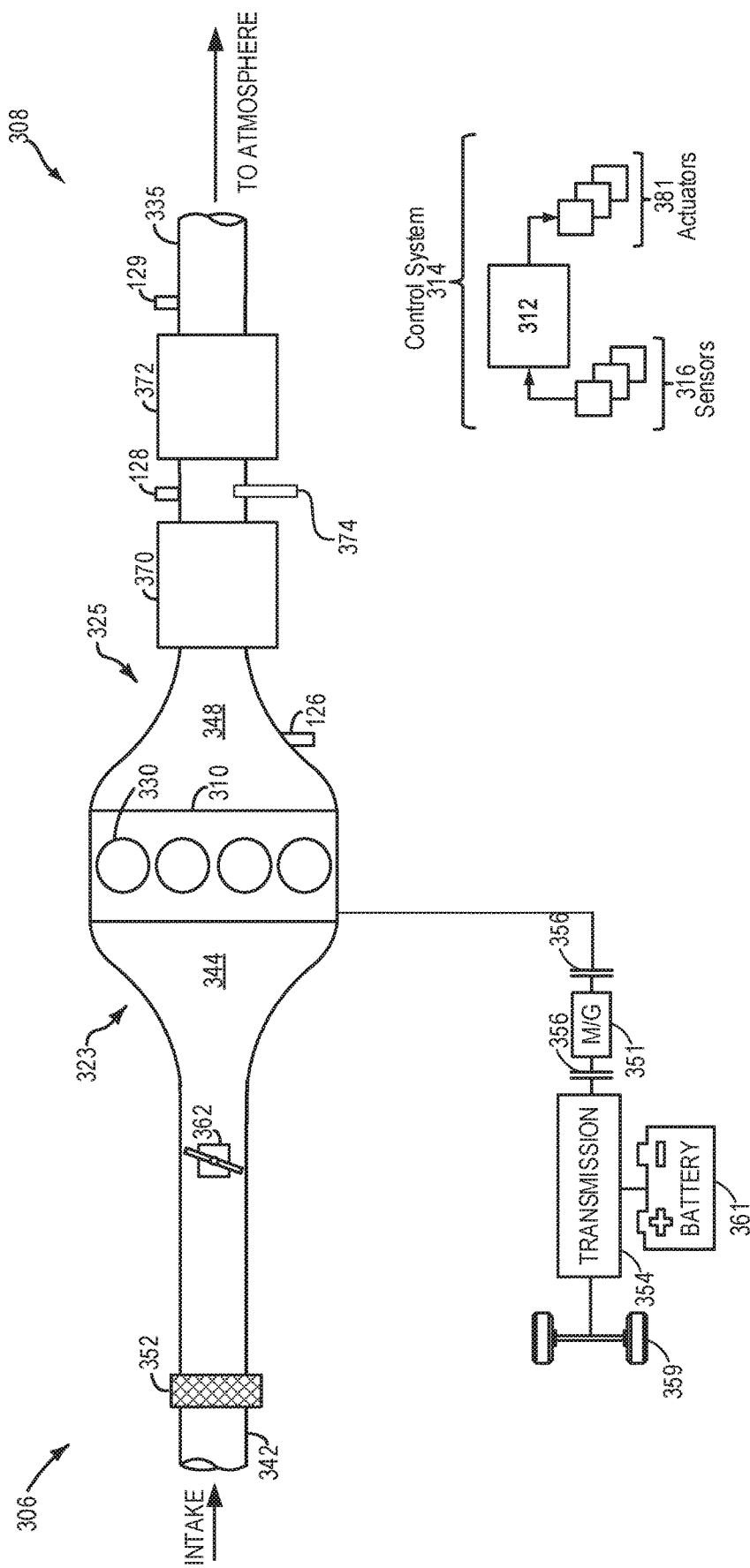
FIG. 3 shows a schematic for an engine of a hybrid vehicle.
Figure 4A:
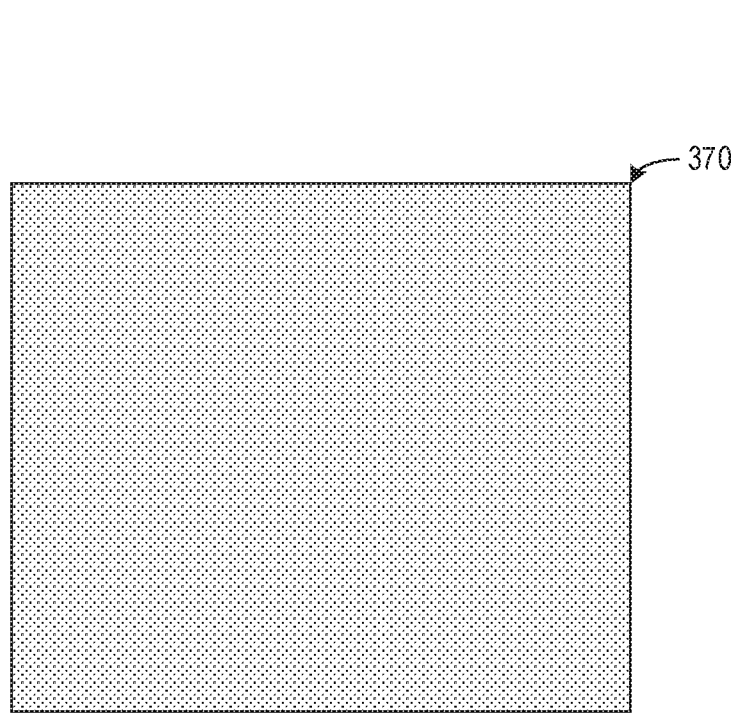
FIGS. 4A and 4B illustrate example configurations for a lean $No_x$ trap comprising low and high-temperature storing regions.
Figure 4B:
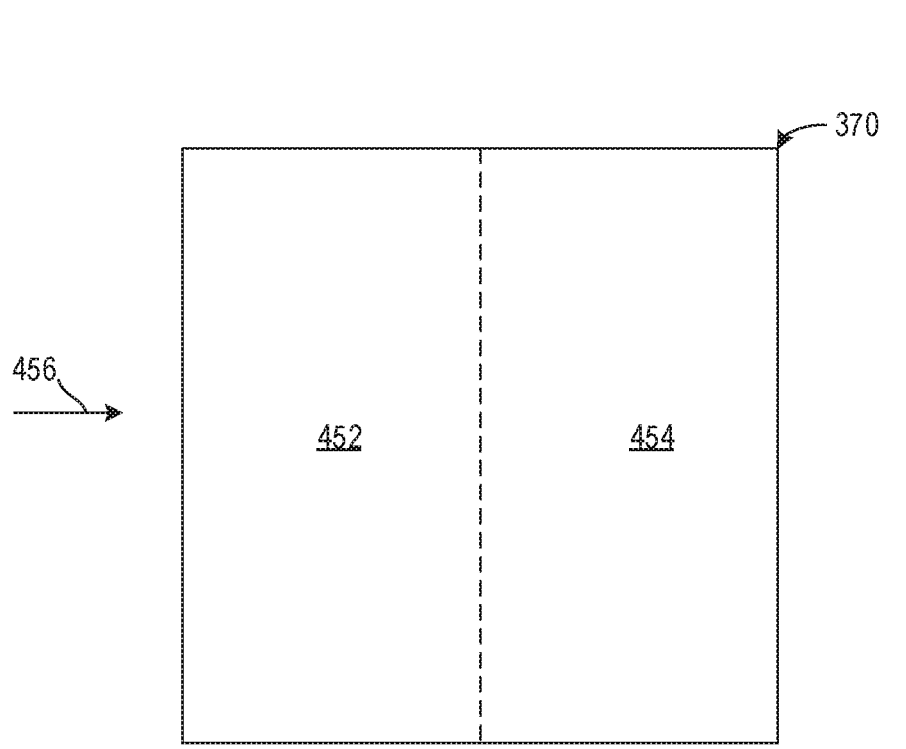
Figure 5:
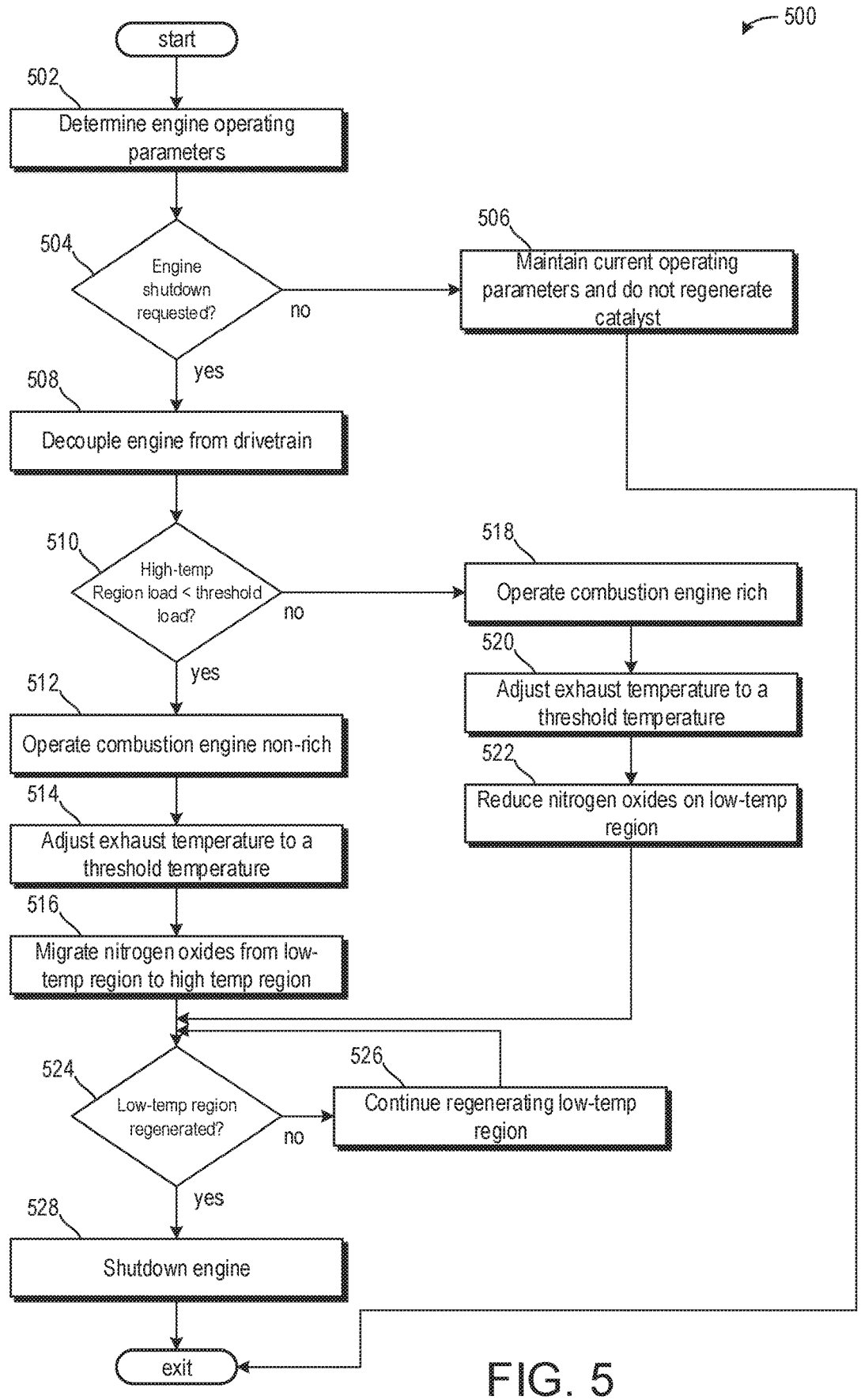
FIG. 5 illustrates a method for selecting non-rich exhaust gas or rich exhaust gas to regenerate only the low-temperature storing region of the LNT based on conditions of the high-temperature storing region.

The following description relates to systems and methods for partially regenerating a LNT in response to an engine shutdown request. FIGS. 1 and 3 illustrate example of an engine included in a hybrid vehicle, wherein the LNT is arranged in an exhaust passage fluidly coupled to the hybrid vehicle. Exemplary embodiments of the LNT are shown in FIGS. 4A and 4B. Methods for regenerating only the low-temperature storing region of the LNT are shown in FIGS. 2 and 5. An engine operating sequence illustrating adjustments in engine operating conditions and LNT conditions is graphically shown in FIG. 6.

In one embodiment, the disclosure provides a simple way of regenerating the LNT catalytic converter. Providing a sufficient storage capacity for nitrogen oxides for a cold start of the internal combustion engine enables nitrogen oxides contained in the exhaust gas mixture to be stored and converted at a later time. Unwanted emissions of nitrogen oxides into the environment can be reduced, thus making it possible to comply with emissions limits, for example.

The provision of low-temperature storage locations and high-temperature storage locations in the LNT catalytic converter furthermore allows split regeneration. In other words, it is not necessary to regenerate the entire LNT catalytic converter; instead, it is possible selectively to regenerate only the low-temperature storage locations, which are principally responsible for storing nitrogen oxides after the cold starting of the internal combustion engine. For selective regeneration of the low-temperature storage locations, it may be the case that less fuel is consumed for providing a rich exhaust gas mixture or performing measures for increasing the temperature of the exhaust gas mixture, than for regenerating the entire LNT catalytic converter. The regeneration of the high-temperature storage locations can then take place under different conditions, for example, during passive conditions which may occur due to driver demand.

In a method according to the disclosure for regenerating an LNT catalytic converter arranged in an exhaust line of an internal combustion engine and having low-temperature storage locations and high-temperature storage locations, there is a changeover from a combustion mode to a regeneration mode when there is a shutdown demand for shutting down the internal combustion engine. The regeneration mode may comprise monitoring the temperature of the LNT catalytic converter, ensuring the decoupling of the internal combustion engine of a drive train from the remainder of the drive train, carrying out fuel combustion in the internal combustion engine in order to produce an exhaust gas mixture, feeding the exhaust gas mixture to the LNT catalytic converter and hence also to the low-temperature storage locations until the temperature of the LNT catalytic converter and hence also the temperature of the low-temperature storage locations reaches a threshold temperature, regenerating the low-temperature storage locations when the threshold temperature is reached, and shutting down the internal combustion engine after the regeneration of the low-temperature storage locations has been completed.

The features of the regeneration mode can be carried out as successive steps, e.g. in the sequence in which they have been mentioned. Depending on demands, however, the features can also be carried out simultaneously, in an overlapping way or in a different sequence. For example, monitoring of the temperature of the low-temperature storage unit can be carried out during the entire method.

The low-temperature storage locations and high-temperature storage locations of the LNT catalytic converter are storage locations which are optimized for the storage of nitrogen oxides within a certain temperature range, wherein the temperature range of the low-temperature storage locations is below the temperature range of the high-temperature storage locations. The low-temperature storage locations and high-temperature storage locations can be distributed in a variety of ways in the LNT catalytic converter. For example, the low-temperature storage locations may be upstream of the high-temperature storage locations. Additionally or alternatively, the low-temperature storage locations may be intermixed with the high-temperature storage locations. The low-temperature storage locations can be configured for the storage of nitrogen oxides in a temperature range below a threshold temperature of 200° C. or 250° C., for example. In contrast, the high-temperature storage locations can be configured for the storage of nitrogen oxides in a temperature range above the threshold temperature.

The low-temperature and high-temperature storage locations can be formed by different chemical elements within the LNT catalytic converter, for example. Thus, for example, the low-temperature storage locations can contain cerium or be formed by cerium, while the high-temperature storage locations can contain barium or be formed by barium.

At low temperatures, nitric oxide (NO) can be stored in the low-temperature storage locations. At higher temperatures of about 150° C. to 200° C., nitric oxide is oxidized to nitrogen dioxide ($NO_2$). This nitrogen dioxide can then be stored in the high-temperature storage locations.

The NO molecules stored in the low-temperature storage locations desorb at temperatures of about 250° C. to 300° C., while the $NO_2$ molecules stored in the high-temperature storage locations continue to remain stored at these temperatures. The NO molecules desorbed from the low-temperature storage locations can be oxidized and then stored in the high-temperature storage locations. In contrast, desorption of $NO_2$ molecules from the high-temperature storage locations takes place only at higher temperatures from about 350° C. In one example, the $NO_2$ molecules desorb at 400° C. The specific temperature ranges are dependent inter alia on the specific selection of materials for an LNT catalytic converter. However, thermal desorption from the low-temperature storage locations may begin at about 250° C. From a temperature of 310° C., complete thermal desorption of the nitrogen oxides from the low-temperature storage locations may be assumed.

The shutdown demand for shutting down the combustion mode can be, for example, a demand for shutting down the combustion mode produced via an automatic start/stop system, e.g. a demand for freewheeling or "coasting", or, in the case of a hybrid electric motor vehicle, a demand for shutting down the combustion mode by switching over to an electric driving mode. The shutdown demand can be output automatically without the intervention of a person operating the arrangement.

A special case of a shutdown demand for shutting down the combustion mode is a demand for shutting down the arrangement with which the method is being carried out since, when the arrangement is shut down, the combustion mode is also ended.

A shutdown demand can be brought about, for example, by a suitable movement of the key in the ignition lock or a movement of a switch, e.g. pressing a start/stop button. For example, the shutdown demand can consist in a vehicle and hence also the internal combustion engine thereof being shut down by a user of the vehicle via a key or a start/stop button.

As an option, the changeover from the combustion mode to the regeneration mode can be dependent on the satisfaction of further conditions. For example, provision can be made for the changeover to take place only if cooling of the LNT catalytic converter to a temperature below a minimum temperature is to be expected. Such cooling can be expected, for example, if the analysis of a driving profile shows that the internal combustion engine is being conclusively shut down and restarting before the temperature falls to a temperature below the minimum temperature is not to be expected. This can be the case, for example, if the analysis of the driving profile shows that a parking space has been reached.

The temperature of the LNT catalytic converter can be monitored via temperature sensors. These can be arranged in the exhaust line, (e.g. directly upstream or downstream of the LNT catalytic converter), and can provide feedback regarding the temperature of the exhaust gas mixture. The temperature of the LNT catalytic converter and thus also the temperature of the low-temperature storage locations can then be derived from the temperature of the exhaust gas mixture. As an alternative, the temperature of the LNT catalytic converter can be determined directly via a temperature sensor arranged therein.

At the beginning of the regeneration mode, it is ensured that the internal combustion engine of the drive train is decoupled from the remainder of the drive train, (e.g. the wheels of a motor vehicle). For this purpose, a check can be made to determine whether the gear shift is in a neutral position. If this is not the case, the internal combustion engine is decoupled from the remainder of the drive train by disengaging a clutch, which may include an electrically actuated clutch.

In the internal combustion engine, fuel combustion is carried out in order to produce an exhaust gas mixture. For this purpose, the internal combustion engine can be operated with a lean air-fuel mixture. Here, the temperature of the exhaust gas mixture is higher than the ambient temperature owing to the heat generated during the combustion process. The specific temperature of the exhaust gas mixture is dependent inter alia on the quantity of fuel supplied and burnt.

Fuel combustion in the regeneration mode can take place by maintaining a previous fuel combustion of the combustion mode, for example. However, there is also the possibility of starting fuel combustion only as part of the regeneration mode, (e.g. if a hybrid electric motor vehicle has first been operated in an electric driving mode).

The hot exhaust gas mixture produced is then fed to the LNT catalytic converter and thus also to the low-temperature storage locations, with the result that the low-temperature storage locations are heated. The supply of the exhaust gas mixture continues at least until a threshold temperature is reached. This threshold temperature can be defined in advance and is dependent on the desired regeneration method. The threshold temperature can be dependent on the temperature range of the low-temperature storage locations and can be 200° C. or 250° C., for example. By way of example, the threshold temperature can be set to a temperature at which thermal desorption of nitrogen oxides from the low-temperature storage locations occurs (e.g., more nitrogen oxides are desorbed than adsorbed).

Once the threshold temperature has been reached, the low-temperature storage locations are regenerated. As such, the stored nitrogen oxides are removed in order to increase the storage capacity for nitrogen oxides.

After the completion of regeneration of the low-temperature storage locations, the internal combustion engine is shut down. There is now once again sufficient storage capacity for nitrogen oxides available in the low-temperature storage locations for a restart of the internal combustion engine, in particular for a cold start. It is advantageously possible to significantly reduce the emissions of nitrogen oxides, particularly after a cold start of the internal combustion engine where the temperature of the LNT catalytic converter at which nitrogen oxides cannot yet be stored to a sufficient extent in the high-temperature storage locations of the LNT catalytic converter or aftertreated via an SCR catalytic converter.

As an option, the temperature of the LNT catalytic converter can be set in such a way that only regeneration of the low-temperature storage locations but not of the high-temperature storage locations takes place. For example, the temperature of the LNT catalytic converter can be adjusted in such a way that an upper threshold temperature, above which regeneration, in particular regeneration via thermal desorption of the high temperature storage locations takes place, is not exceeded.

According to various variant embodiments, the regeneration of the low-temperature storage locations can be accomplished via thermal desorption and/or a rich-mixture operation of the internal combustion engine. In one example, regeneration can be performed exclusively via thermal desorption.

The regeneration of the low-temperature storage locations via thermal desorption can be accomplished by passive thermal desorption of the nitrogen oxides. That is to say that, when a certain temperature is reached, e.g. the threshold regeneration temperature, nitrogen oxides stored in the low-temperature storage locations may be desorbed. The desorbed nitrogen oxides can then be adsorbed in the high-temperature storage locations. The temperature can preferably be controlled in such a way that thermal desorption of nitrogen oxides from the high-temperature storage locations is avoided. In other words, the threshold regeneration temperature may allow desorption of nitrogen oxides from the low-temperature storage locations and adsorption of the desorbed nitrogen oxides onto the high-temperature storage locations.

It is advantageous that no additional fuel is demanded for regeneration via this regeneration method, and therefore the additional fuel consumption can be kept low. Said another way, regeneration of only the low-temperature storage locations may consume less fuel than regeneration of all of the LNT including the low and high-temperature storage regions. Carbon dioxide emissions due to additional fuel consumption can be reduced since, first of all, no reducing agent is desired for conversion of the nitrogen oxides. Rather, the reduction can optionally be carried out under more favorable temperature conditions, (e.g. after a minimum temperature has been reached, at which less reducing agent is demanded to reduce a certain quantity of nitrogen oxides) such as during a driving demand which may also passively meet reduction conditions. In one variant embodiment, regeneration is performed exclusively via thermal desorption.

The completion of regeneration of the low-temperature storage locations via thermal desorption can be ascertained on the basis of a model. Starting from the quantity of nitrogen oxides stored in the low-temperature storage locations, for example, a model of this kind can indicate the demanded temperature and time needed for the thermal desorption thereof. If additional measures for increasing the temperature of the exhaust gas mixture are used, these can be allowed for in the model.

Another possible regeneration method is regeneration via rich-mixture operation of the internal combustion engine. In this case, the internal combustion engine is operated with a rich air-fuel mixture, and therefore the exhaust gas mixture is also rich (e.g., a combustion air ratio $\lambda<1$).

As mentioned above, a rich exhaust gas mixture comprises components with a reducing action, which reduce the stored nitrogen oxides to nitrogen. The nitrogen formed escapes from the low-temperature storage locations, thus increasing the storage capacity of said locations for nitrogen oxides again.

Regeneration via a rich-mixture operation of the internal combustion engine can be triggered by reaching the threshold regeneration temperature. In other words, when the threshold regeneration temperature is reached in the regeneration mode, the air-fuel mixture fed to the internal combustion engine can be switched from a lean mixture to a rich mixture. This can be enabled by corresponding configuration of the engine control system.

If regeneration is carried out via a rich-mixture operation of the internal combustion engine, the completion of regeneration of the low-temperature storage locations can be ascertained, for example, from the combustion air ratio downstream of the LNT catalytic converter, which can be determined via a lambda probe, for example. If a combustion air ratio $\lambda>1$ is determined downstream of the LNT catalytic converter during the rich-mixture operation of the internal combustion engine, the reducing components contained in the exhaust gas mixture are still demanded to reduce the stored nitrogen oxides. If, on the other hand, a combustion air ratio $\lambda<1$ is determined downstream of the LNT catalytic converter, it can be assumed that regeneration is complete.

In one example, regeneration via the rich-mixture operation of the engine may not comprise migration of the nitrogen oxides from the low-temperature storage regions to the high-temperature storage regions. As such, a total load of the catalyst may be reduced during the rich-mixture operation at the threshold regeneration temperature. Methods are provided below for selecting which of the regeneration operations to execute in response to catalyst conditions.

As an alternative, it is also possible to ascertain the completion of regeneration during regeneration via rich-mixture operation of the internal combustion engine via a model which determines the quantity of fuel demanded to reduce nitrogen oxides from the quantity of nitrogen oxides stored in the low-temperature storage locations, for example. If this quantity has been fed to the internal combustion engine beyond a stoichiometric air-fuel ratio, it is possible to assume completion of regeneration. If appropriate, correction factors can be taken into account. However, separate regeneration of the low-temperature and the high-temperature storage locations is not possible via rich-mixture operation of the internal combustion engine.

Both regeneration methods, the thermal desorption and the regeneration via rich-mixture operation of the internal combustion engine, can also be combined with one another. Such a combination of regeneration methods can allow particularly rapid regeneration of the low-temperature storage locations.

According to various variant embodiments, the completion of regeneration of the low-temperature storage locations can be ascertained via a model. A model of this kind can be configured as a 0-dimensional or 1-dimensional model or as a map-based or reaction-kinetic model.

According to various variant embodiments, the regeneration mode can furthermore comprise increasing a torque of the internal combustion engine in order to increase a temperature of the exhaust gas mixture. By increasing the load of the internal combustion engine, the torque of the internal combustion engine can be increased, thereby bringing about a higher temperature TA of the exhaust gas. For example, an increased quantity of fuel can be injected into the internal combustion engine in order to increase the torque thereof and hence also the temperature of the exhaust gas mixture. In other words, the temperature of the LNT catalytic converter and hence also the temperature of the low-temperature storage locations is dependent on the torque of the internal combustion engine.

It is thereby advantageously possible to achieve rapid heating of the low-temperature storage locations to the threshold temperature, thus enabling regeneration to be started quickly and the duration of the regeneration mode overall to be kept short. Further measures to increase the temperature of the exhaust gas mixture, such as carrying out post-injection of fuel and/or throttling of the air mass flow of the internal combustion engine, are not demanded since the threshold regeneration temperature can be achieved by increasing the load of the internal combustion engine. By dispensing with such further measures, fuel can be saved since both post-injection of fuel and throttling of the air mass flow are not as fuel-efficient.

According to various variant embodiments, the regeneration mode can furthermore comprise recovering kinetic energy produced by the internal combustion engine.

For this purpose, the internal combustion engine can be connected in terms of drive to an electric machine acting as a generator. The electric machine serves to convert kinetic energy produced by the internal combustion engine into electric energy, which can be used, for example, to charge a rechargeable battery connected to the electric machine.

The electric machine can be, for example, the electric machine of a hybrid electric drive train of a hybrid electric motor vehicle. The electric machine can be provided at various positions in the hybrid electric drive train. For example, the electric machine can be provided at the P0 position as a "belt integrated starter generator" (BISG) or at the P1 position as a "crank integrated starter generator" (CISG) or at the P2 position.

The kinetic energy which is produced during the production of the exhaust gas mixture can thus advantageously be used further by being converted into electric energy. It is thereby possible to improve the energy balance overall.

According to various variant embodiments, the regeneration mode can furthermore comprise outputting an optical and/or acoustic signal in order to indicate that the regeneration mode is being carried out. For example, a display unit for outputting an optical message can be present in order to provide information on the carrying out of the regeneration mode. It is thereby possible to avoid an unwanted reaction of the vehicle driver since they could otherwise be surprised by the carrying out of the regeneration mode, which is associated with operation of the internal combustion engine and possibly even with a spike in the torque, despite the fact that a shutdown demand has been issued.

A control unit according to the disclosure for controlling regeneration of an LNT catalytic converter arranged in an exhaust line of an internal combustion engine and having low-temperature storage locations and high-temperature storage locations, is configured to output a control signal to bring about a changeover from a combustion mode to a regeneration mode when there is a shutdown demand for shutting down the internal combustion engine. The regeneration mode comprises monitoring the temperature of the LNT catalytic converter, ensuring the decoupling of the internal combustion engine of a drive train from the remainder of the drive train, carrying out fuel combustion in the internal combustion engine in order to produce an exhaust gas mixture, feeding the exhaust gas mixture to the LNT catalytic converter until the temperature of the LNT catalytic converter reaches the threshold temperature, regenerating the low-temperature storage locations when the threshold regeneration temperature is reached, and shutting down the internal combustion engine after the regeneration of the low-temperature storage locations has been completed.

The threshold regeneration temperature can be defined as described in relation to the method.

After the changeover to the regeneration mode has been brought about, the control unit can control the regeneration mode. The regeneration mode can be configured in accordance with the above explanations relating to the method according to the disclosure. To this extent, the above statements intended to explain the method according to the disclosure also serve to describe the control unit according to the disclosure. The advantages of the control unit according to the disclosure correspond to those of the method according to the disclosure and to the corresponding variant embodiments thereof.

In addition to a control unit according to the disclosure, an arrangement according to the disclosure for regenerating an LNT catalytic converter having low-temperature storage locations and high-temperature storage locations has a drive train comprising a clutch and an internal combustion engine, wherein the internal combustion engine can be decoupled from the remainder of the drive train via the clutch, an exhaust line, adjoining the internal combustion engine, for receiving an exhaust gas mixture produced by the internal combustion engine, the LNT catalytic converter arranged in the exhaust line, and a sensor for monitoring the temperature of the LNT catalytic converter.

The arrangement according to the disclosure can be used, for example, to carry out the method according to the disclosure explained above. Therefore, the above statements intended to explain the method according to the disclosure also serve to describe the arrangement according to the disclosure. The advantages of the arrangement according to the disclosure correspond to those of the method according to the disclosure and to the corresponding variant embodiments thereof.

As an option, further exhaust gas aftertreatment devices, such as. an SCR catalytic converter, can be arranged in the exhaust line. An SCR catalytic converter may be arranged downstream of the LNT catalytic converter.

Moreover, the arrangement can optionally have a high-pressure and/or low-pressure exhaust gas recirculation system.

According to various variant embodiments, the arrangement can furthermore have an electric machine, which is shaped to recover kinetic energy produced by the internal combustion engine during the regeneration mode.

According to further variant embodiments, the clutch can be configured as an electrically actuated clutch (e-clutch).

Thus, the internal combustion engine can be decoupled from the remainder of the drive train via an electrically actuated clutch. An e-clutch may replace a manual clutch of a manual transmission, for example, or can be provided as an additional clutch in order, for example, to allow separation from an automatic transmission.

An electrically actuated clutch usually has an electric actuator, which can be actuated by an electronic control device of the arrangement. For example, the electrically actuated clutch can be controlled completely by the electronic control device of the arrangement, (e.g. by an electronic control device of a motor vehicle), said control device automatically disengaging the clutch in order to decouple the internal combustion engine from the remainder of the drive train. The electrically actuated clutch may allow the internal combustion engine to decouple automatically from the drive train, (e.g. without intervention by the driver), and automatically to carry out the regeneration mode.

A motor vehicle according to the disclosure has an arrangement with the features described above. A motor vehicle should be understood to mean a vehicle driven by a motor, e.g. a land vehicle, aircraft or watercraft. The vehicle can be configured as a hybrid electric vehicle, e.g. as a mild hybrid electric vehicle or full hybrid electric vehicle.

FIGS. 1 and 3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows schematically one embodiment of a motor vehicle 10 according to the disclosure, which may be configured as a hybrid electric motor vehicle. The motor vehicle 10 has a drive train 4 for moving the wheels 14, comprising an internal combustion engine 2, which has four cylinders 13, a clutch 7, and a transmission 15. It should be noted that the number of cylinders 13 is in no way restrictive and that it is also possible to employ internal combustion engines with a different number of cylinders, e.g. with six or eight cylinders 13. The transmission 15 may be an automatic transmission or a manual transmission.

The internal combustion engine 2 can be a diesel or spark-ignition engine. These can be configured to carry out various combustion and mixture preparation methods and can be operated with various fuels. In one example, the internal combustion engines 2 is operated at least temporarily in lean-mixture mode (with excess air) and with fuels comprising hydrocarbon compounds. The internal combustion engine 2 may expel an exhaust gas mixture 5 which may comprise nitrogen oxides during some operating conditions.

An inlet air line 11 for directing inlet air 12 or an air-fuel mixture formed via the inlet air 12 to the combustion chambers of the cylinders 13 of the internal combustion engine 2 is furthermore provided. Moreover, the motor vehicle 10 shown in FIG. 1 has an exhaust line 1 for discharging the exhaust gas mixture 5 formed by the internal combustion engine 2. An LNT catalytic converter 3 having low-temperature storage locations and high-temperature storage locations is arranged in the exhaust line 1. To enable the temperature of the LNT catalytic converter 3 to be monitored, a temperature sensor 8 is arranged on the LNT catalytic converter 3. The low-temperature storage locations and high-temperature storage locations may be mixed throughout the LNT catalytic converter 3. Additionally or alternatively, an upstream portion of the LNT catalytic converter 3 may correspond to the low-temperature storage location and a downstream portion, relative to a direction of the exhaust gas mixture 5 may correspond to the high-temperature storage location.

As an option, further exhaust gas aftertreatment devices, e.g. an SCR catalytic converter (not shown), can be arranged in the exhaust line 1 downstream of the LNT catalytic converter 3.

Moreover, there is an electric machine 9, which is a "belt integrated starter generator" (BISG), e.g. with a rated voltage of 12 V or 48 V, and which is arranged at the P0 position. As an alternative, the electric machine 9 can be shaped as a P1 or P2 electric machine and optionally combined with another electric machine, e.g. a P3 or P4 electric machine. The electric machine 9 is used for energy recovery (recuperation) of kinetic energy produced by the internal combustion engine 2. The electric machine 9 can be connected to a rechargeable battery (not shown) to enable electric energy produced during recovery to be stored.

The motor vehicle 10 in the example of FIG. 1 is thus a hybrid electric motor vehicle, in which the drive train 4 is configured as a parallel hybrid drive train and the electric machine 9 is part of the parallel hybrid drive train.

The internal combustion engine 2 can be decoupled from the remainder of the drive train 4 via an electrically actuated clutch 7.

The motor vehicle 10 furthermore has a control unit 6, which is connected in terms of signal transmission to the temperature sensor 8, the electric machine 9, the internal combustion engine 2 and the clutch 7. The control unit 6 can be implemented by hardware and/or software and, physically, can be of single- or multi-part configuration. In particular, the control unit 6 can be part of an engine control system or can be integrated into said system. In a typical configuration, the engine control system of a motor vehicle 10 acts as the control unit 6.

To carry out the method described below, a changeover from a combustion mode to a regeneration mode to regenerate the low-temperature storage locations of the LNT catalytic converter 3 may be carried out when there is a shutdown demand for shutting down the internal combustion engine 2.

Turning now to FIG. 2, it shows a method 200 for executing a regeneration of the LNT catalytic converter.

The method 200 begins at step S1, which includes determining whether there is a shutdown demand for shutting down the internal combustion engine 2. A shutdown demand may comprise, for example, turning of the ignition key in the ignition lock or actuation of an off button by the vehicle driver demanding shutdown of the motor vehicle 10. If a shutdown demand is present, there is a changeover from the combustion mode to the regeneration mode. If a shutdown demand is not present, then the changeover does not occur and the combustion mode is maintained.

The method 200 proceeds to S2 to execute the regeneration mode. In S2, it is ensured that the internal combustion engine 2 of the drive train 4 is decoupled from the remainder of the drive train 4. For this purpose, a check is made to determine whether the gear shift of the motor vehicle 10 is in a neutral position, (e.g., in the idle position). If this is not the case, the internal combustion engine 2 is decoupled from the remainder of the drive train 4 by disengaging the electrically actuated clutch 6.

In step S3, combustion of fuel is then carried out in the internal combustion engine 2 in order to produce an exhaust gas mixture 5. For this purpose, the internal combustion engine 2 is initially supplied with a lean air-fuel mixture, with the result that a lean exhaust gas mixture 5 is also discharged into the exhaust line 1. To enable a high temperature of the exhaust gas mixture 5 and hence of the low-temperature storage locations of the LNT catalytic converter 3 to be reached as quickly as possible, the torque of the internal combustion engine 2 is increased in step S3.

In step S4, the exhaust gas mixture 5 is fed to the LNT catalytic converter 3 in order to increase the temperature thereof and thus also the temperature of the low-temperature storage locations. In step S5, a check is made to determine whether the temperature of the LNT catalytic converter 3 has reached a threshold regeneration temperature, which may correspond to a desorption temperature of the low-temperature storage region of the LNT catalytic converter while mitigating and/or blocking desorption from the high-temperature storage region. For this purpose, the temperature of the LNT catalytic converter 3 is monitored.

If it is ascertained in step S5 that the threshold temperature has not yet been reached, the method returns to step S4 and the LNT catalytic converter 3 continues to be supplied with a lean exhaust gas mixture 5 in order to increase its temperature. If, on the other hand, it is ascertained in step S5 that the threshold temperature has been reached, the method continues with step S6.

In step S6, the low-temperature storage locations are regenerated. In the illustrative embodiment, regeneration is accomplished via a thermal desorption. In one example, the thermal desorption is conducted without a rich-mixture operation of the engine. As such, nitrogen oxides are not reduced, but may migrate to the high-temperature storage regions.

As a further option, regeneration in step S6 can also comprise rich-mixture operation of the internal combustion engine 2. The rich exhaust gas mixture 5 thereby produced is fed to the LNT catalytic converter 3, wherein the rich components contained in the exhaust gas mixture 5 have a reducing action. Nitrogen oxides stored in the low-temperature storage locations can thereby be reduced and removed from the low-temperature storage locations. The regeneration increases the storage capacity for nitrogen oxides in the low-temperature storage locations, with the result that nitrogen oxides contained in the exhaust gas mixture 5 after a cold start and the discharge thereof into the environment can be mitigated, in particular. As such, if the rich-mixture operation is included in the regeneration, the migration of nitrogen oxides to the high-temperature storage regions may be reduced due to reduction of released nitrogen oxides in the presence of the rich exhaust gas mixture.

In the following step S7, a check is made to determine whether regeneration has been carried out sufficiently, which may be determined via a model, for example. Additionally or alternatively, the regeneration may be complete in response to a temperature sensed downstream of the LNT catalytic converter, an air/fuel ratio sensed downstream of the LNT catalytic converter, and/or a threshold time elapsing.

If it is ascertained in step S7 that regeneration is not yet complete, the method returns to step S6, and the regeneration of the low-temperature storage locations continues. If, on the other hand, it is ascertained in step S7 that regeneration is complete, the method continues to step S8. In step S8, the internal combustion engine 2 is shut down. The motor vehicle 10 can then also be shut down overall in accordance with the shutdown demand of the vehicle driver.

As an option, kinetic energy produced by the internal combustion engine 2 can be recovered via the electric machine 9 from step S3 onward. The electric machine 9 converts the kinetic energy into electric energy, which can be fed for storage to a rechargeable battery, for example. The stored electric energy can then be used in some other way, ensuring that the kinetic energy produced is utilized.

FIG. 3 shows a schematic depiction of a hybrid vehicle system 306 that can derive propulsion power from engine system 308 and/or an on-board energy storage device. An energy conversion device, such as a generator, may be operated to absorb energy from vehicle motion and/or engine operation, and then convert the absorbed energy to an energy form suitable for storage by the energy storage device.

Engine system 308 may include an engine 310 having a plurality of cylinders 330. Engine 310 may be used similarly to engine 2 of FIG. 1 in one example. Engine 310 includes an engine intake 323 and an engine exhaust 325. Engine intake 323 includes an air intake throttle 362 fluidly coupled to the engine intake manifold 344 via an intake passage 342. Air may enter intake passage 342 via air filter 352. Engine exhaust 325 includes an exhaust manifold 348 leading to an exhaust passage 335 that routes exhaust gas to the atmosphere. Engine exhaust 325 may include one or more emission control devices 370 mounted in a close-coupled or far vehicle underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 308 is a boosted engine system, the engine system may further include a boosting device, such as a turbocharger (not shown).

In one example, the emission control device 370 is a first emission control device arranged upstream of a second emission control device 372 relative to a direction of exhaust gas flow. A lambda sensor 374 may be arranged at a junction between the first emission control device 370 and the second emission control device 372. Additionally or alternatively, a temperature sensor 128 may also be arranged between the first emission control device and the second emission control device. Feedback from either of the lambda sensor 374 or the temperature sensor 128 may indicate a regeneration of the first emission control device 370. For example, if a temperature sensed by the temperature sensor 128 is equal to a temperature greater than a threshold regeneration temperature, then the regeneration may be complete. In one example, the temperature is 310° C. and the threshold regeneration temperature is 250° C. As another example, if the temperature sensed by the temperature sensor 128 is equal to the threshold regeneration temperature for a threshold amount of time (e.g., 30 seconds), then the regeneration may be complete. Additionally or alternatively, feedback from the lambda sensor 374, which may indicate an air/fuel ratio value downstream of the first emission control device 370, may provide an indication of a regeneration progress. As one example, if the lambda sensor 374 indicates an air/fuel ratio is equal to an engine air/fuel ratio, then the regeneration may be complete.

In one example, the first emission control device 370 may be used similarly to the LNT catalytic converter 3 of FIG. 1. In one example, the first emission control device 370 (herein, LNT 370) is a combination catalyst, which may comprise nitrogen oxide capturing abilities and oxidation catalyst functionality. The second emission control device 372 may be a selective catalyst reduction (SCR) catalytic converter. In one example, additionally or alternatively, the SCR catalytic converter may comprise particulate filter functionality in combination with the SCR functionality.

Vehicle system 306 may further include control system 314. Control system 314 is shown receiving information from a plurality of sensors 316 (various examples of which are described herein) and sending control signals to a plurality of actuators 381 (various examples of which are described herein). As one example, sensors 316 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 306. As another example, the actuators may include the throttle 362.

Controller 312 may be configured as a conventional microcomputer including a microprocessor unit, input/output ports, read-only memory, random access memory, keep alive memory, a controller area network (CAN) bus, etc. Controller 312 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Controller 312 may be used similarly to control unit 6 of FIG. 1.

In some examples, hybrid vehicle 306 comprises multiple sources of torque available to one or more vehicle wheels 359. In other examples, vehicle 306 is a conventional vehicle with only an engine, or an electric vehicle with only electric machine(s). In the example shown, vehicle 306 includes engine 310 and an electric machine 351. Electric machine 351 may be a motor or a motor/generator. A crankshaft of engine 310 and electric machine 351 may be connected via a transmission 354 to vehicle wheels 359 when one or more clutches 356 are engaged. In the depicted example, a first clutch 356 is provided between a crankshaft and the electric machine 351, and a second clutch 356 is provided between electric machine 351 and transmission 354. Controller 312 may send a signal to an actuator of each clutch 356 to engage or disengage the clutch, so as to connect or disconnect crankshaft from electric machine 351 and the components connected thereto, and/or connect or disconnect electric machine 351 from transmission 354 and the components connected thereto. Transmission 354 may be a gearbox, a planetary gear system, or another type of transmission. The powertrain may be configured in various manners including as a parallel, a series, or a series-parallel hybrid vehicle.

Electric machine 351 receives electrical power from a traction battery 361 to provide torque to vehicle wheels 359. Electric machine 351 may also be operated as a generator to provide electrical power to charge battery 361, for example during a braking operation.

As another example, the electric machine 351 may be at least partially used to provide electrical power to charge battery 361 during a regeneration of the LNT 370 in response to an engine shutdown request. During the engine shutdown request, the engine may be decoupled from a drivetrain such that the engine may not provide power to wheel 359. Prior to shutting down the engine in response to the request, the engine is fueled and operated to regenerate low-temperature storing regions of the LNT 370. In one example, the regeneration may occur at a stoichiometric or lean air/fuel ratio within a temperature range, to promote regeneration of the low-temperature storing regions and not regeneration of high-temperature storing regions. In such an example, nitric oxide may be desorbed from the low-temperature storing regions, oxidized to nitrogen dioxide, and subsequently stored in the high-temperature storing regions. In this way, a total load of the LNT 370 may not be decreased, but nitrogen oxides may migrate from the low-temperature storing regions to the high-temperature storing regions. In this way, a load of the low-temperature storing regions is decreased and a load of the high-temperature storing regions is increased during the regeneration with only thermal desorption.

In another example, the LNT 370 may be partially regenerated via rich exhaust gases with a temperature within the temperature range. As such, the high-temperature storing region may still not be regenerated. However, the rich exhaust gases may reduce nitric oxides desorbed from the low-temperature storing region to nitrogen gas, which may be expelled to an ambient atmosphere. In such an example, the total load of the LNT 370 is decreased. More specifically, the load of the low-temperature storing regions is decreased and the load of the high-temperature storing regions is maintained (e.g., unchanged).

Turning now to FIG. 4A, it shows a first embodiment 400 of the LNT 370. As such, components previously introduced may be similarly numbered in this figure and subsequent figures. In the first embodiment 400 of the LNT 370, it is shown having low-temperature storing regions, indicated by white areas, and high-temperatures storing regions, indicated by black areas. As shown, the low-temperature and high-temperature storing regions are interspersed with one another throughout a volume of the LNT 370.

Turning now to FIG. 4B, it shows a second embodiment 450 of the LNT 370. The second embodiment 450 comprises a first region 452 arranged upstream of a second region 454 relative to a direction of exhaust gas flow, shown by arrow 456. The first region 452 may correspond to the low-temperature storing region and the second region 454 may correspond to the high-temperature storing region. As such, a downstream face of the low-temperature storing region may be in face-sharing contact with an upstream face of the high-temperature storing region.

In either the first embodiment 400 or the second embodiment 450, nitrogen oxides from the low-temperature storing region may migrate to the high-temperature storing region during a non-rich regeneration of the low-temperature storing region. During the non-rich regeneration (e.g., the thermal desorption), a total load of the LNT 370 is unchanged, but a shift in the load of stored nitrogen oxides occurs, wherein the load of the low-temperature storing region is decreased and the load of the high-temperature storing region is increased.

Turning now to FIG. 5, it shows a method 500 for executing a lean or rich regeneration of a low-temperature storing region of a LNT. Instructions for carrying out method 500 and the method 200 included above may be executed by a controller based on instructions stored on a memory of the controller and in conjunction with signals received from sensors of the engine system, such as the sensors described above with reference to FIGS. 1 and 3. The controller may employ engine actuators of the engine system to adjust engine operation, according to the methods described below.

The method 500 begins at 502, which includes determining, estimating, and/or measuring one or more engine operating parameters. Engine operating parameters may include one or more of a throttle position, manifold vacuum, engine speed, vehicle speed, and air/fuel ratio.

The method 500 proceeds to 504, which includes determining if an engine shutdown is requested. The engine shutdown may be requested by a vehicle operator by actuating an ignition key or depressing a button. Additionally or alternatively, the engine shutdown may be requested in response to an all-electric vehicle mode being selected, wherein the vehicle may be propelled solely by an electric motor while the engine is shutdown (e.g., not fueled). Additionally or alternatively, the engine shutdown may be requested as part of a start/stop.

If the engine shutdown is not requested, then the method 500 proceeds to 506 to maintain current engine operating parameters and does not regenerate the catalyst.

If the engine shutdown is requested, then the method 500 proceeds to 508 to decouple the engine from a drivetrain. The engine may be decoupled from the drivetrain via a clutch (e.g., electric clutch 7 of FIG. 1). As such, if the engine is fueled while being decoupled from the drivetrain, power generated by the engine may not be transferred to the wheels resulting in movement of the vehicle.

In some examples of the method 500, additionally or alternatively, the method may include determining if the shutdown request corresponds to an engine shutdown that will last for longer than a threshold duration. The threshold duration may be a dynamic value adjusted in response to one or more conditions including ambient temperature and engine temperature. For example, as ambient temperature decreases, then the threshold duration may also decrease. This may be determined via information from a navigation system, GPS, or other location tracking device. Input from the location tracking device may be correlated to data stored in a look-up table tracking information regarding driver behavior. In one example, the look-up table is a multi-input look-up table wherein the inputs include location, time of day, driver identity, and the like. As one example, if the location if a vehicle operators home and the time of day is 9:00 p.m., then it may be determined that the shutdown request corresponds to an engine shutdown that will elapse for greater than the threshold duration. If the engine shutdown elapses for more than the threshold duration, then a subsequent start of the engine may be a cold-start, wherein it may be desired for low-temperature storing regions of the LNT to be free to capture nitrogen oxides. If the engine shutdown elapses for less than the threshold duration, then a cold-start may not occur during a subsequent engine start and it may not be desired to capture nitrogen oxides in the low-temperature storing regions. In this way, regeneration of the low-temperature regions of the LNT may be further based on a prediction of a duration of an engine shutdown, wherein the partial regeneration of the LNT may be initiated in response to the duration being greater than the threshold duration, indicating a cold-start may occur during a subsequent engine start.

In some examples, additionally or alternatively, the engine shutdown may be delayed to executed the regeneration of the low-temperature storing region of the LNT in response to a low-temperature storing region load being greater than or equal to a threshold load. As such, if the low-temperature storing region load is not greater than the threshold load, then the low-temperature storing region may be capable of storing more nitrogen oxides and its regeneration may not be desired. If the low-temperature storing region load is greater than the threshold load, then its regeneration may be requested.

Following decoupling the engine from the drivetrain at 508, the method 500 proceeds to 510 to determine if a high-temperature storing region load is less than a threshold load. The high-temperature storing region load may be tracked over time in a multi input look-up table with inputs corresponding to air/fuel ratio, exhaust gas temperature, thermal desorption regeneration of the low-temperature storing regions, and regeneration of the high-temperature storing regions. The threshold load may correspond to a load where the high-temperature storing region is fully loaded and unable to adsorb more nitrogen oxides.

If the high-temperature storing region load is less than the threshold load, then the method 500 proceeds to 512 to operate the combustion engine non-rich. As such, the combustion engine is operated at stoichiometric or lean. In one example, a thermal desorption is executed, wherein fuel is not demanded outside of combustion in the engine. As such, the engine may be operated as lean as possible during the thermal desorption, in one example. By doing this, a fuel economy may be increased.

The method 500 proceeds to 514, which includes adjusting the engine temperature to a threshold regeneration temperature. The threshold regeneration temperature may be a single temperature or it may be a temperature range, including a lower temperature threshold and an upper temperature threshold, at which the low-temperature storing region is regenerated while the high-temperature storing region is not. In one example, the threshold regeneration temperature may be a temperature between 250 to 330° C. The engine temperature may be adjusted via increasing a torque and/or a load of the engine to increase an exhaust gas temperature to the threshold regeneration temperature. Due to the threshold regeneration temperature being relatively low, adjustments increasing fuel consumption, such as a post-injection, may be avoided.

The method 500 proceeds to 516, which includes migrating nitrogen oxides from the low-temperature storing region to the high-temperature storing region. In one example, nitric oxides from the low-temperature storing region are desorbed, wherein the nitric oxides are oxidized by oxygen in the exhaust gas to nitrogen dioxide. The high-temperature storing region may adsorb the nitrogen dioxide such that a total load of the LNT is unchanged. In this way, nitrogen containing compounds are moved (e.g., migrated) from the low-temperature storing region to the high-temperature storing region so that nitrogen oxides generated during a cold-start may be captured by the low-temperature storing region. In this way, only the low-temperature storing region is returning to a state configured to capture more nitrogen oxides, while the high-temperature storing region is adjusted to a state configured to capture less nitrogen oxides.

Returning to 510, if the high-temperature storing region load is not less than the threshold load (e.g., greater than or equal to the threshold load), then the method 500 proceeds to 518 to operate the combustion engine rich. As such, an excess of hydrocarbons may be present in the exhaust gas.

The method 500 proceeds to 520, which includes adjusting the exhaust temperature to the threshold regeneration temperature. In one example, 520 is substantially similar to 514 described above, wherein the torque and/or load is adjusted to increase the exhaust temperature. However, the torque and/or load adjustment (e.g., increase) may be less than an increase at 514, due to the exhaust gas at 520 being hotter due to the increased consumption of fuel.

The method 500 proceeds to 522, which includes reducing the nitrogen oxides on the low-temperature storing region. Nitrogen oxides from the low-temperature storing regions may be reduced by the hydrocarbons present in the exhaust gas, which may be expelled through a tailpipe and to an ambient atmosphere. As such, during the regeneration of the low-temperature storing region of the LNT, the total load of the LNT is decreased, wherein the load of the low-temperature storing regions is decreased and the load of the high-temperature storing regions is maintained.

The method 500 may proceed to 524, following 516 or 522, which may include determining if the low-temperature storing region regeneration is complete. The regeneration may be complete in response to a temperature sensed downstream of the LNT, an air/fuel ratio sensed downstream of the LNT, and/or following a threshold time. The regeneration may be complete in response to a temperature greater than 300° C. The regeneration may be complete in response to the air/fuel ratio downstream of the LNT being equal to an engine air/fuel ratio (e.g., an air/fuel ratio upstream of the LNT). The regeneration may be complete following the exhaust gas temperature being at the threshold regeneration temperature for the threshold time.

If the regeneration is not complete, then the method 500 proceeds to 526 to continue regenerating the low-temperature storing region of the LNT and still does not shutdown the engine.

If the regeneration is complete, then the method 500 proceeds to 528 to shut down the engine, which includes no longer fueling the engine.

In this way, the method 500 illustrates a method for regenerating only the low-temperature storing region of the LNT, wherein the method may regenerate the low-temperature storing region via thermal desorption to decrease fuel consumption in response to the load of the high-temperature storing region being less than the threshold load. During the thermal desorption, the load of the low-temperature storing region migrates to the high-temperature storing region so that a net load of the LNT remains unchanged. However, the low-temperature storing region is now configured to capture nitrogen oxides during a subsequent cold-start of the engine.

If the load of the high-temperature storing region is too high (e.g., not below the threshold load), then the low-temperature storing region is regenerated via rich exhaust gas, which results in the net load of the LNT decreasing, due to the nitrogen oxides desorbed from the low-temperature storing region being reduced and expelled from the LNT, rather than migrating.

The regeneration of only the low-temperature storing region of the LNT and not the high-temperature storing region occurs in response to at least an engine shutdown request. The engine shutdown is delayed so that the regeneration may be executed. In some examples, an alert or message may be displayed to a vehicle operator indicating the regeneration is occurring.

Additionally or alternatively, the regeneration may occur following an engine shutdown request, wherein the engine shutdown request corresponds to an engine shutdown that will elapse for a threshold duration and result in a subsequent engine activation being a cold-start, where it may be desired for the low-temperature storing region to store nitrogen oxides.

Figure 6:
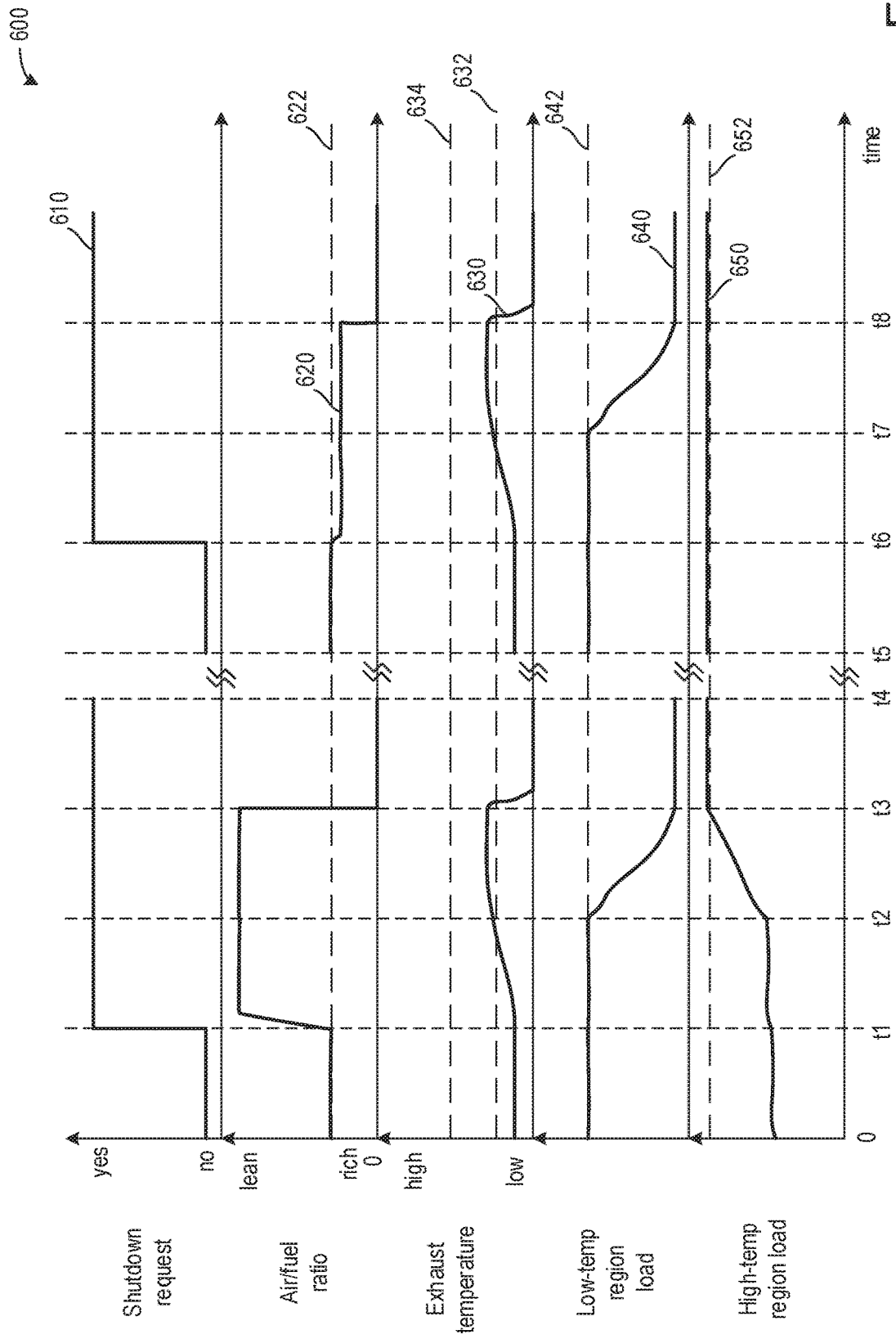
FIG. 6 illustrates an engine operating sequence graphically displaying a prophetic example of LNT conditions based on non-rich and rich exhaust gas regenerations of the low-temperature storing region.

Turning now to FIG. 6, it shows a graph 600 illustrating an engine operating sequence over time with various adjustments to the engine operation. Plot 610 represents an engine shutdown request, plot 620 represents an engine air/fuel ratio and dashed line 622 illustrates a stoichiometric air/fuel ratio, plot 630 represents an exhaust temperature, and dashed lines 632 ad 634 represent lower and upper thresholds of a regeneration temperature of the low-temperature storing region, plot 640 represents a low-temperature storing region load and dashed line 642 represents a threshold low-temperature region storing load, and plot 650 represents a high-temperature storing region load and dashed line 652 represents a threshold high-temperature region storing load. Time increases from a left to right side of the figure.

Prior to t1, an engine shutdown request is not present (plot 610). The air/fuel ratio (plot 620) is substantially equal to a stoichiometric air/fuel ratio (dashed line 622). The exhaust gas temperature (plot 630) is less than a lower threshold temperature (dashed line 632). The low-temperature storing region load (plot 640) is substantially equal to the threshold low-temperature storing region load (dashed line 642). In such an example, the low-temperature storing region of the LNT may be request a regeneration due to its load being equal to the threshold low-temperature storing region load. The high-temperature storing region load (plot 650) is less than the threshold high-temperature storing region load (dashed line 652). At t1, an engine shutdown is requested.

Between t1 and t2, a partial regeneration of the LNT is initiated during a delay of the engine shutdown. As described above, this may further include decoupling the engine from the drivetrain. The partial regeneration may further include recuperating power generated by the engine during the regeneration to charge a battery. The partial regeneration may include regenerating only the low-temperature storing region of the LNT. As such, the partial regeneration may not include regenerating the high-temperature region of the LNT, which may decrease fuel consumption. The low-temperature storing region regeneration may include increasing the air/fuel ratio to conserve fuel and increasing the exhaust gas temperature to a temperature between the lower threshold temperature and the upper threshold temperature. The lower threshold temperature may correspond to a lowest temperature at which the low-temperature storing region may be regenerated. The upper threshold temperature may correspond to a highest temperature at which the low-temperature storing region may be regenerated without regenerating the high-temperature storing region. At t2, the exhaust gas temperature reaches a temperature greater than the lower threshold temperature.

Between t2 and t3, the exhaust gas temperature is between the lower and upper threshold temperatures. As such, only the low-temperature storing region of the LNT is regenerated. The low-temperature storing region load decreases, wherein the desorbed nitrogen oxides are adsorbed by the high-temperature storing region. As such, the high-temperature storing region load increases toward the threshold high-temperature storing region load.

At t3, the regeneration is complete. The low-temperature storing region load and the high-temperature storing region load remain unchanged. The engine is shutdown between t3 and t4.

Between t4 and t5, the engine is activated and nitrogen oxides are adsorbed onto the low-temperature storing region. At t5, the engine shutdown request is not present. Between t5 and t6, the low-temperature storing region load is again equal to the threshold low-temperature storing region load, thereby signaling a request for a partial regeneration during a subsequent engine shutdown request. The high-temperature storing region load is greater than the threshold high-temperature region storing load, and as a result, the partial regeneration may be executed via rich exhaust gases and not solely via thermal desorption.

At t6, the engine shutdown request is present. Between t6 and t7, the engine shutdown is delay so that the partial regeneration may be executed. Due to the high-temperature storing region load, the air/fuel ratio is adjusted to a lower ratio so that exhaust gas may be rich. The exhaust temperature is increased toward the lower threshold temperature.

At t7, the exhaust gas temperature is between the lower threshold temperature and the upper threshold temperature. Between t7 and t8, the low-temperature storing region load begins to decrease as nitrogen oxides are desorbed from the low-temperature storing region. The nitrogen oxides are reduced by the rich exhaust gas and expelled from the LNT. As such, the high-temperature storing region load remains unchanged during the rich, partial regeneration of the LNT, wherein the rich, partial regeneration comprises regenerating only the low-temperature storing region of the LNT. At t8, the partial regeneration is complete and the engine is shutdown. After t8, the engine remains shutdown.

In this way, a lean $No_x$ trap may be partially regenerated in response to an engine shutdown request. An engine shutdown in response to the request may be delayed to execute the partial regeneration, which may include increasing an exhaust gas temperature to a temperature so that only a low-temperature storing region of the lean $No_x$ trap is regenerated. The technical effect of regenerating only the low-temperature storing region and not a high-temperature storing region is to conserve fuel. The regeneration of the low-temperature storing region may be based on conditions of the high-temperature storing region, wherein if the high temperature storing region is able to store more nitrogen oxides, then the low-temperature storing region may be regenerated via a thermal desorption in the presence of stoichiometric or lean exhaust gases. The thermal desorption may promote migration of the nitrogen oxides from the low to high-temperature storing regions, thereby leaving a total load of the lean $No_x$ trap unchanged. However, if the high-temperature storing region is unable to store more nitrogen oxides, then the low-temperature storing region may be regenerated via a combination of the thermal desorption and rich exhaust gas, wherein the rich exhaust gas may reduce nitrogen oxides desorbed from the low-temperature storing regions. The combination of the thermal desorption and rich exhaust gas may decrease the total load of the lean $No_x$ trap, wherein the load of the low-temperature storing region is reduced and the load of the high-temperature storing region is unchanged.

In another representation a method for regenerating an LNT catalytic converter arranged in an exhaust line of an internal combustion engine and having low-temperature storage locations and high-temperature storage locations, in which there is a changeover from a combustion mode to a regeneration mode when there is a shutdown demand for shutting down the internal combustion engine, wherein the regeneration mode comprises monitoring the temperature of the LNT catalytic converter, ensuring the decoupling of the internal combustion engine of a drive train from the remainder of the drive train, carrying out fuel combustion in the internal combustion engine in order to produce an exhaust gas mixture, feeding the exhaust gas mixture to the LNT catalytic converter until the temperature of the LNT catalytic converter reaches a threshold temperature, regenerating the low-temperature storage locations when the threshold temperature is reached, and shutting down the internal combustion engine after the regeneration of the low-temperature storage locations has been completed.

An example of the method optionally comprising the example above, further comprises where the low-temperature storage locations are regenerated via thermal desorption and/or rich-mixture operation of the internal combustion engine.

An example of the method optionally comprising any of the previous example, further comprises where the completion of regeneration of the low-temperature storage locations is ascertained via a model.

An example of the method optionally comprising any of the previous example, further comprises where the model is configured as a 0-dimensional or 1-dimensional model.

An example of the method optionally comprising any of the previous example, further comprises where the model is configured as a map-based or reaction-kinetic model.

An example of the method optionally comprising any of the previous example, further comprises where the regeneration mode furthermore comprises increasing a torque of the internal combustion engine in order to increase a temperature of the exhaust gas mixture.

An example of the method optionally comprising any of the previous example, further comprises where the regeneration mode furthermore comprises recovering kinetic energy produced by the internal combustion engine.

An example of the method optionally comprising any of the previous example, further comprises where the regeneration mode furthermore comprises outputting an optical and/or acoustic signal in order to indicate that the regeneration mode is being carried out.

A control unit for executing the method above and controlling regeneration of an LNT catalytic converter arranged in an exhaust line of an internal combustion engine and having low-temperature storage locations and high-temperature storage locations, said control unit being configured to output a control signal to bring about a changeover from a combustion mode to a regeneration mode when there is a shutdown demand for shutting down the internal combustion engine, wherein the regeneration mode comprises monitoring the temperature of the LNT catalytic converter, ensuring the decoupling of the internal combustion engine of a drive train from the remainder of the drive train, carrying out fuel combustion in the internal combustion engine in order to produce an exhaust gas mixture, feeding the exhaust gas mixture to the LNT catalytic converter until the temperature of the LNT catalytic converter reaches a threshold temperature, regenerating the low-temperature storage locations when the threshold temperature is reached, and shutting down the internal combustion engine after the regeneration of the low-temperature storage locations has been completed.

In another representation, an arrangement for regenerating an LNT catalytic converter having low-temperature storage locations and high-temperature storage locations, having a drive train comprising a clutch and an internal combustion engine, wherein the internal combustion engine can be decoupled from the remainder of the drive train via the clutch, an exhaust line, adjoining the internal combustion engine, for receiving an exhaust gas mixture produced by the internal combustion engine, the LNT catalytic converter arranged in the exhaust line, a sensor for monitoring the temperature of the LNT catalytic converter, and a control unit.

An example of the arrangement further includes where an electric machine configured to recover kinetic energy produced by the internal combustion engine during the regeneration mode.

An example of the arrangement optionally including any of the previous examples, further includes where the clutch is configured as an electrically actuated clutch.

An example of the arrangement optionally including any of the previous examples, further includes where the clutch is arranged on a hybrid electric motor vehicle.

An embodiment of a system comprises an engine comprising an exhaust system comprising a lean-$NO_x$-trap (LNT), and a controller with computer-readable instructions stored on non-transitory memory thereof that when executed enable the controller to regenerate only a low-temperature storing region of the LNT without regenerating a high-temperature storing region of the LNT in response to an engine shutdown request. A first example of the system further includes where the instructions further enable the controller to regenerate the low-temperature storing region with non-rich exhaust gases comprising an exhaust gas temperature within a regeneration temperature range. A second example of the system, optionally including the first example, further includes where the low-temperature storing region is regenerated via non-rich exhaust gases in response to a high-temperature storing region load being less than a threshold load. A third example of the system, optionally including the first and/or second examples, further includes where the instructions further enable the controller to regenerate the low-temperature storing region with rich exhaust gases comprising an exhaust gas temperature within a regeneration temperature range. A fourth example of the system, optionally including one or more of the first through third examples, further includes where the low-temperature storing region is regenerated via rich exhaust gases in response to a high-temperature storing region load being greater than a threshold load. A fifth example of the system, optionally including one or more of the first through fourth examples, further includes where the engine is arranged on a hybrid vehicle, and where the instructions further enable the controller to decouple the engine from a drivetrain via an electric clutch prior to regenerating the low-temperature storing region of the LNT and after the engine shutdown request. A sixth example of the system, optionally including one or more of the first through fifth examples, further includes where the engine shutdown request comprises one or more of an engine start/stop, changeover to an all-electric vehicle operation, actuation of an ignition key, and depression of a button.

An embodiment of a method comprises in response to a shutdown request for an engine, decoupling the engine from a drivetrain, fueling the engine, increasing an exhaust gas temperature to a temperature between a lower threshold temperature and an upper threshold temperature, regenerating only a low-temperature storing region adjacent to a high-temperature storing region of a lean $No_x$ trap, and shutting down the engine in response to the low-temperature storing region being regenerated. A first example of the method further includes where migrating nitrogen oxides desorbed from the low-temperature storing region during the regenerating to the high-temperature storing region, and where a total load of the lean $No_x$ trap is unchanged. A second example of the method, optionally including the first example, further includes where the migrating occurs in the presence of non-rich exhaust gases, and where a high-temperature storing region load is less than a threshold high-temperature storing region load prior to the regenerating. A third example of the method, optionally including the first and/or second examples, further includes where reducing nitrogen oxides desorbed from the low-temperature storing region during the regenerating, and where a total load of the lean $No_x$ trap decreases. A fourth example of the method, optionally including one or more of the first through third examples, further includes where the reducing occurs in the presence of rich exhaust gases, and where a high-temperature storing region load is greater than a threshold high-temperature region storing load prior to the regenerating. A fifth example of the method, optionally including one or more of the first through fourth examples, further includes where the regenerating comprises decreasing a load of the low-temperature storing region and increasing a load of the high-temperature storing region. A sixth example of the method, optionally including one or more of the first through fifth examples, further includes where increasing the exhaust gas temperature comprises increasing one or more of a torque and a load of the engine. A seventh example of the method, optionally including one or more of the first through sixth examples, further includes where the engine is arranged on a hybrid vehicle, and where energy from the engine is recuperated during the regenerating to recharge a battery.

An embodiment of a hybrid vehicle system comprises an engine and an electric motor configured to provide motion to wheels of a drivetrain, an electric clutch for adjusting a coupling between the engine and the drivetrain, a lean $No_x$ trap arranged in an exhaust passage fluidly coupled to the engine, the lean $No_x$ trap comprising a low-temperature storing region configured to be regenerated at a temperature above a lower threshold temperature, further comprising a high-temperature storing region configured to be regenerated at a temperature above an upper threshold temperature, and a controller with computer-readable instructions stored on non-transitory memory thereof that when executed enable the controller to actuate the electric clutch to decouple the engine in response to an engine shutdown request, fuel the engine, increase the exhaust gas temperature to a temperature between the lower threshold temperature and the upper threshold temperature, decrease a load of only the low-temperature storing region, and shutdown the engine following regeneration of the low-temperature storing region. A first example of the hybrid vehicle further comprises where instructions further enable the controller to estimate a high-temperature storing region load, and where regeneration of the low-temperature storing region comprises non-rich exhaust gas in response to the high-temperature storing region load being less than a threshold load, and where the non-rich exhaust gas decreases a low-temperature storing region load and increases the high-temperature storing region load, and where regeneration of the high-temperature storing region comprises rich exhaust gas in response to the high temperature storing region load being greater than the threshold load, and where the rich exhaust gas decreases the low-temperature storing region load and the high-temperature storing region load. A second example of the vehicle, optionally including the first example, further comprises where the low-temperature storing region and the high-temperature storing region are interspersed within the lean $No_x$ trap, and where regeneration of the low-temperature storing region is complete following one or more of a temperature sensed downstream of the lean $No_x$ trap via a temperature sensor being equal to a regeneration temperature, an air/fuel ratio sensed downstream of the lean $No_x$ trap via a lambda sensor being equal to an engine air/fuel ratio, and a threshold duration elapsing. A third example of the vehicle, optionally including the first and/or second examples, further includes where the regeneration of the low-temperature storing region is a partial regeneration of the lean $No_x$ trap without regenerating the high-temperature storing region. A fourth example of the vehicle, optionally including one or more of the first through third examples, further includes where the engine shutdown request further comprises where a low-temperature storing region load is greater than or equal to a threshold load.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
   an engine comprising an exhaust system comprising a lean-$NO_x$-trap (LNT); and
   a controller with computer-readable instructions stored on non-transitory memory thereof that when executed enable the controller to:
   regenerate only a low-temperature storing region of the LNT with lean exhaust gases without regenerating a high-temperature storing region of the LNT in response to an engine shutdown request.

2. The system of claim 1, wherein the instructions further enable the controller to regenerate the low-temperature storing region with lean exhaust gases comprising an exhaust gas temperature within a regeneration temperature range.

3. The system of claim 2, wherein the low-temperature storing region is regenerated via lean exhaust gases in response to a high-temperature storing region load being less than a threshold load.

4. The system of claim 1, wherein the instructions further enable the controller to regenerate the low-temperature storing region with rich exhaust gases comprising an exhaust gas temperature within a regeneration temperature range.

5. The system of claim 4, wherein the low-temperature storing region is regenerated via rich exhaust gases in response to a high-temperature storing region load being greater than or equal to a threshold load.

6. The system of claim 1, wherein the engine is arranged on a hybrid vehicle, and where the instructions further enable the controller to decouple the engine from a drivetrain via an electric clutch prior to regenerating the low-temperature storing region of the LNT and after the engine shutdown request.

7. The system of claim 6, wherein the engine shutdown request comprises one or more of an engine start/stop, changeover to an all-electric vehicle operation, actuation of an ignition key, and depression of a button.

8. A method comprising:
   in response to a shutdown request for an engine, decoupling the engine from a drivetrain;
   fueling the engine;
   increasing an exhaust gas temperature to a temperature between a lower threshold temperature and an upper threshold temperature;
   regenerating only a low-temperature storing region adjacent to a high-temperature storing region of a lean $NO_x$ trap with lean exhaust gases; and
   shutting down the engine in response to the low-temperature storing region being regenerated.

9. The method of claim 8, further comprising migrating nitrogen oxides desorbed from the low-temperature storing region during the regenerating to the high-temperature storing region, and where a total load of the lean $NO_x$ trap is unchanged.

10. The method of claim 9, wherein the migrating occurs with only lean exhaust gases, and where a high-temperature storing region load is less than a threshold high-temperature storing region load prior to the regenerating.

11. The method of claim 8, further comprising switching from lean exhaust gases to rich exhaust gases, and reducing nitrogen oxides desorbed from the low-temperature storing region during the regenerating, and where a total load of the lean $NO_x$ trap decreases.

12. The method of claim 11, wherein the reducing occurs in the presence of rich exhaust gases, and where a high-temperature storing region load is greater than a threshold high-temperature region storing load prior to the regenerating.

13. The method of claim 8, wherein the regenerating comprises decreasing a load of the low-temperature storing region and increasing a load of the high-temperature storing region.

14. The method of claim 8, wherein increasing the exhaust gas temperature comprises increasing one or more of a torque and a load of the engine.

15. The method of claim 8, wherein the engine is arranged on a hybrid vehicle, and where energy from the engine is recuperated during the regenerating to recharge a battery.

16. A hybrid vehicle system comprising:
an engine and an electric motor configured to provide motion to wheels of a drivetrain;
an electric clutch for adjusting a coupling between the engine and the drivetrain;
a lean $NO_x$ trap arranged in an exhaust passage fluidly coupled to the engine, the lean $NO_x$ trap comprising a low-temperature storing region configured to be regenerated at a temperature above a lower threshold temperature, further comprising a high-temperature storing region configured to be regenerated at a temperature above an upper threshold temperature; and
a controller with computer-readable instructions stored on non-transitory memory thereof that when executed enable the controller to:
actuate the electric clutch to decouple the engine in response to an engine shutdown request;
fuel the engine;
increase an exhaust gas temperature to a temperature between the lower threshold temperature and the upper threshold temperature;
decrease a load of only the low-temperature storing region with lean exhaust gases; and
shutdown the engine following regeneration of the low-temperature storing region.

17. The hybrid vehicle system of claim 16, wherein the instructions further enable the controller to estimate a high-temperature storing region load, and where regeneration of the low-temperature storing region comprises lean exhaust gas in response to the high-temperature storing region load being less than a threshold load, and where the lean exhaust gas decreases a low-temperature storing region load and increases the high-temperature storing region load, and where regeneration of the high-temperature storing region comprises rich exhaust gas in response to the high-temperature storing region load being greater than the threshold load, and where the rich exhaust gas decreases the low-temperature storing region load and the high-temperature storing region load.

18. The hybrid vehicle system of claim 16, wherein the low-temperature storing region and the high-temperature storing region are interspersed within the lean $NO_x$ trap, and where regeneration of the low-temperature storing region is complete following one or more of a temperature sensed downstream of the lean $NO_x$ trap via a temperature sensor being equal to a regeneration temperature, an air/fuel ratio sensed downstream of the lean $NO_x$ trap via a lambda sensor being equal to an engine air/fuel ratio, and a threshold duration elapsing.

19. The hybrid vehicle system of claim 16, wherein the regeneration of the low-temperature storing region is a partial regeneration of the lean NO, trap without regenerating the high-temperature storing region.

20. The hybrid vehicle system of claim 16, wherein the engine shutdown request further comprises where a low-temperature storing region load is greater than or equal to a threshold load.

* * * * *